United States Patent Office 2,917,510
Patented Dec. 15, 1959

2,917,510

18-OXYGENATED-$\Delta^4$-3,20-DIOXO-9$\alpha$-HALO-PREGNENES

Albert Wettstein and Georg Anner, Basel, Switzerland, assignors to Ciba Pharmaceutical Products, Inc., Summit, N.J.

No Drawing. Application May 18, 1955
Serial No. 509,391

Claims priority, application Switzerland May 25, 1954

12 Claims. (Cl. 260—239.55)

This invention relates to 11,18,21-trioxygenated $\Delta^4$-3,20-dioxo-9$\alpha$-halogeno-pregnenes i.e. $\Delta^4$-3,20-dioxo-9$\alpha$-halogeno-pregnenes, which contain in the 11-, 18- and 21-position a hydroxy or oxo group, and esters and ethers, for example acetals thereof, wherein halogeno stands, for example, for chlorine, fluorine, bromine and iodine. Especially valuable are the aforesaid compounds wherein halogeno is chlorine or fluorine.

The novel compounds of the present invention demonstrate valuable physiological activities. They possess suprarenal cortex hormone activity and can be employed in the treatment of adrenal cortical insufficiency. The new compounds can be administered in any suitable dosage form, in the same manner as hydrocortisone, cortisone, aldosterone or desoxycorticosterone.

The novel compounds in which the halogeno radical is bromine are readily prepared by converting 18,21-di-oxygenated $\Delta^{4,9(11)}$-3,20-dioxo-pregnadienes, preferably in the form of the esters thereof into 18,21-dioxygenated $\Delta^4$-3,20-dioxo-9$\alpha$-bromo-11$\beta$-hydroxy-pregnenes, for example, by treating the former with N-bromacetamide or N-bromosuccinimide, preferably in the presence of a catalyst, such as sulfuric acid. The 9$\alpha$-bromo-11$\beta$-hydroxy compounds can then be converted via 18,21-dioxygenated $\Delta^4$-3,20-dioxo-9,11$\beta$-oxido-pregnenes into the corresponding 9$\alpha$-chloro-11$\beta$-hydroxy and 9$\alpha$-fluoro-11$\beta$-hydroxy compounds. These conversions can be carried out as indicated below for the transformation of a specific $\Delta^4$-3,20-dioxo-9$\alpha$-bromo-11,28,21-trihydroxy-pregnene-18,21-diester:

$\Delta^4$ - 3,20 - dioxo - 9$\alpha$ - bromo - 11$\beta$ - hydroxy - 18,21-diacetoxy-pregnene is treated with a dehydrobrominating agent, that is, an agent which splits off hydrogen bromide, to form $\Delta^4$-3,20-dioxo-9,11$\beta$-oxido-18,21-diacetoxy-pregnene, which is then treated with hydrogen chloride to produce $\Delta^4$-3,20-dioxo-9$\alpha$-chloro-11$\beta$-hydroxy-18,21-diacetoxy-pregnene, or with hydrogen fluoride to produce $\Delta^4$ - 3,20 - dioxo - 9$\alpha$ - fluoro - 11$\beta$ - hydroxy-18,21-diacetoxy-pregnene. When hydrogen iodide is employed there is obtained $\Delta^4$-3,20-dioxo-9$\alpha$-iodo-11$\beta$-hydroxy-18,21-diacetoxy-pregnene.

As dehydrobrominating agents there can be employed advantageously hydroxides or oxides of metals of the first and second groups of the periodic system, for example, silver oxide, and also tertiary bases such as pyridine or collodine, or aluminum oxide. It is of advantage to use tertiary bases in combination with one of the aforesaid monovalent or divalent metal hydroxides or oxides.

By hydrolysis of the $\Delta^4$-3,20-dioxo-19,11$\beta$-oxido-18,21-dihydroxy-pregnene-18,21-diesters, selective esterification in 21-position and dehydrognation in 18-position there are obtained $\Delta^4$ - 3,18,20 - trioxo - 9,11$\beta$ - oxido - 21 - hydroxy-pregnene-21-esters which can be converted by the action of a hydrogen halide into the $\Delta^4$-3,18,20-trioxo-11$\beta$-hydroxy-9$\alpha$-halogeno-pregnene-21-esters. The hydrolysis, esterification and dehydrogenation steps are carried out in known manner.

The novel 18,21-dioxygenated $\Delta^{4,9(11)}$-3,20-dioxo-pregnadienes employed as starting materials can be prepared by known methods, for example by splitting off water from 18,21 - dioxygenated $\Delta^4$ - 3,20 - dioxo - 11$\beta$ - hydroxy-pregnenes with a dehydrating agent, e.g., phosphorus oxychloride in the presence of a base such as pyridine. In this way $\Delta^4$-3,20-dioxo-11$\beta$,18,21-trihydroxy - pregnene yields $\Delta^{4,9(11)}$ - 3,20 - dioxo - 18,21-dihydroxy-pregnadiene, which is esterified to produce the 18,21-diacyloxy compounds.

The novel compounds can be employed in combination with any suitable carrier to facilitate the administration thereof.

The following examples will serve to illustrate the preparation of the novel compounds.

Example 1

A solution of 170 milligrams of $\Delta^{4,9(11)}$-3,20-dioxo-18,21-diacetoxy-pregnadiene in 4.5 cc. of tertiary butanol and 1 cc. of water is mixed, while stirring, at about 15° C. with 120 milligrams of N-bromacetamide and 1 cc. of sulfuric acid of 4 percent strength. After a few minutes the reaction solution becomes yellow-brown. For the purpose of decolorization an aqueous 1 percent solution of sodium sulfite and 50 cc. of water are then added, the mixture is extracted with a mixture of chloroform and ether (1:3) and the extract is washed several times with an ice-cold 1 percent sodium carbonate solution and water. By evaporating the dried chloroform-ether solution in vacuo there is obtained $\Delta^4$-3,20-dioxo-9$\alpha$-bromo-11$\beta$-hydroxy-18,21-diacetoxy-pregnene.

A solution of 110 milligrams of the aforesaid $\Delta^4$-3,20-dioxo - 9$\alpha$ - bromo - 11$\beta$ - hydroxy - 18,21 - diacetoxy-pregnene in 2 cc. of anhydrous pyridine is agitated with 150 milligrams of freshly precipitaed and dried silver oxide for 24 hours in the dark. The silver oxide is then filtered off with suction, and the filtrate is evaporated in vacuo. For the purpose of re-acetylating the $\Delta^4$-3,20-dioxo-9,11$\beta$-oxido-18,21-dihydroxy-pregnene thus formed, the residue is dissolved in 1 cc. of pyridine and 0.5 cc. of acetic anhydride, and the whole is allowed to stand for 14 hours at room temperature. The mixture is then poured into cold dilute sulfuric acid, the precipitated reaction product is taken up in a mixture of chloroform and ether (1:3), and the extract is washed with dilute sulfuric acid, sodium bicarbonate solution and water. After drying and evaporating the chloroform-ether solution in vacuo, there is obtained $\Delta^4$-3,20-dioxo-9,11$\beta$-oxido-18,21-diacetoxy-pregnene.

100 milligrams of the above 9,11-oxido-compound are dissolved in 10 cc. of dioxane, then mixed with 2.5 cc. of 2.5 N-hydrochloric acid, and the whole is allowed to stand for one hour at room temperature. Water is then added and the whole is extracted with a mixture of chloroform and ether (1:3). By washing the extract with water, drying it and evaporating the solvent in vacuo, there is obtained $\Delta^4$-3,20-dioxo-9$\alpha$-chloro-11$\beta$-hydroxy-18,21-diacetoxy-pregnene.

By reacting the $\Delta^4$-3,20-dioxo-9,11$\beta$-oxido-18,21-diacetoxy-pregnene in the same manner with hydrofluoric acid, there is obtained $\Delta^4$-3,20-dioxo-9$\alpha$-fluoro-11$\beta$-hydroxy-18,21-diacetoxy-pregnene.

The $\Delta^{4,9}$-3:20-dioxo-18,21-diacetoxy-pregnadiene used as starting material can be prepared, for example, as follows:

1 gram of $\Delta^4$-3,20-dioxo-11$\beta$-18,21,trihydroxy-pregnene (prepared for example as described in application Ser. No. 480,061, filed January 5, 1955, by reduction of $\Delta^5$ - 3,20 - diethylenedioxy - 11$\beta$,21 - dioxy - 18 - oxo-pregnene with lithium aluminium hydride followed by hydrolysis of the ketal groups is dissolved in 10 cc. of pyridine, the solution is cooled in a mixture of ice and sodium chloride and 1 gram of phosphorus oxychloride is added dropwise. After allowing the whole to stand for 14 hours at room temperature, it is poured on to ice and the 4,9(11)-3,20-dioxo-18,21-dihydroxy-pregnadiene is extracted, which is then converted into Δ4,9(11)-3,20-dioxo-18,21-diacetoxy-pregnadiene by acetylation with 10 cc. of acetic anhydride and 10 cc. of pyridine.

*Example 2*

To a solution of 80 milligrams of Δ4-3,20-dioxo-9,11β-oxido-18,21-diacetoxy-pregnene in 15 cc. of methanol there are added 100 milligrams of potassium bicarbonate in 3.5 cc. of water. The reaction mixture is kept for 48 hours at 20° C., then concentrated in vacuo. The residue still containing water is extracted with chloroform-ether (1:3). After washing the extract with water, the solvents are dried and evaporated. The residue, Δ4-3,20-dioxo-9,11β-oxido-18,21-dihydroxy-pregnene, is dissolved in 1.5 cc. pyridine. After addition of 1 cc. acetic anhydride at 0° C. the mixture is kept at 25° C. for 2 days and then extracted with ether. The ethereal extract is washed with 1 percent hydrochloric acid, water, 2 percent sodium bicarbonate solution and water, and dried and evaporated to yield Δ4-3,20-dioxo-9,11β-oxido-18-hydroxy-21-acetoxy-pregnene.

To a solution of 100 milligrams of chromic acid in 5 cc. of pyridine are added at 0° C. 55 milligrams of Δ4 - 3,20 - dioxo - 9,11β - oxido - 18 - hydroxy - 21-acetoxy-pregnene. The mixture is kept at room temperature for 20 hours and then concentrated in vacuo. The residue is treated with ice and water and extracted with methylene chloride. After washing the methylene chloride solution with 1 percent hydrochloric acid and water the solution is dried and evaporated in vacuo. The residue is Δ4-3,18,20-trioxo-9,11β-oxido-21-acetoxy-pregnene.

A solution of 20 milligrams of Δ4-3,18,20-trioxo-9,11β-oxido-21-acetoxy-pregnene in 2 cc. of dioxane is treated with 0.5 cc. of 2.5 N-hydrochloric acid, and the whole is allowed to stand for one hour at room temperature. Water is then added and the mixture extracted with chloroform-ether (1:3). By washing the extract with water, drying it and evaporating the solvent there is obtained Δ4-3,18,20-trioxo-9α-chloro-11β-hydroxy-21-acetoxy-pregnene.

By treating Δ4-3,18,20-trioxo-9,11β-oxido-21-acetoxy-pregnene in the same way with hydrofluoric acid, there is obtained Δ4-3,18,20-trioxo-9α-fluoro-11β-hydroxy-21-acetoxy-pregnene.

What is claimed is:

1. Δ4 - 3,20 - dioxo - 11,18,21 - trihydroxy - 9α-chloro-pregnene.
2. Δ4 - 3,20 - dioxo - 11,18,21 - trihydroxy - 9α-fluoro-pregnene.
3. Δ4 - 3,18,20 - trioxo - 11,21 - dihydroxy - 9α-chloro-pregnene.
4. Δ4 - 3,18,20 - trioxo - 11,21 - dihydroxy - 9α-fluoro-pregnene.
5. Δ4 - 3,20 - dioxo - 9,11β - oxido - 18,21 - dihydroxy-pregnene.
6. Δ4-3,18-20-trioxo-9,11β-oxido-21-hydroxy-pregnene.
7. A compound of the formula:

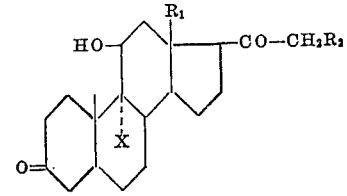

in which formula $R_1$ represents a member selected from the group consisting of a free hydroxymethyl group, a hydroxymethyl group esterified with a lower aliphatic carboxylic acid and a free aldehyde group, $R_2$ represents a member selected from the group consisting of a free hydroxyl group and a hydroxyl group esterified with a lower aliphatic carboxylic acid and X is a halogen atom.

8. Δ4 - 3,20 - dioxo - 9α - fluoro - 11β - hydroxy-18,21-diacetoxy-pregnene.
9. Δ4 - 3,20 - dioxo - 9α - chloro - 11β - hydroxy, 18,21-diacetoxy-pregnene.
10. Δ4 - 3,18,20 - trioxo - 9α - chloro - 11β - hydroxy-21-acetoxy-pregnene.
11. Δ4 - 3,18,20, trioxo - 9α - fluoro - 11β - hydroxy-21-acetoxy-pregnene.
12. A compound of the group consisting of Δ4-3,20-dioxo - 9,11β - oxido - 18,21 - dihydroxy - pregnenes, Δ4-3,18,20-trioxo-9,11β-oxido-21-hydoxy-pregnenes, 21-monoesters of these compounds and 18,21-diesters of the Δ4 - 3,20 - dioxo - 9,11β - oxido - 18,21 - dihydroxy-pregnenes, said esters being formed with lower aliphatic carboxylic acids.

References Cited in the file of this patent
UNITED STATES PATENTS

| 2,596,563 | Kaufman | May 13, 1952 |
| 2,597,190 | Sarett | May 20, 1952 |
| 2,673,849 | Spero | Mar. 30, 1954 |
| 2,686,181 | Julian | Aug. 10, 1954 |
| 2,703,799 | Bergstrom | Mar. 8, 1955 |
| 2,773,080 | Bernstein | Dec. 4, 1956 |

OTHER REFERENCES

Soc. for Endocrinology, May 23, 1953, vol. 2, pages 9–24, Sylria A. Simpson and J. F. Tait.

J. Am. Chem. Soc., vol. 75, 2273–4, 1953, Josef Fried and Emily F. Sabo, ibid., vol. 76, 1455, 1954.

Helvetica Chimica Acta, vol. 37, pages 1163–1220, 1954, S. A. Simpson, J. F. Tait, A. Wettstein, R. Neher, J. V. Euw, O. Schindler, and T. Reichstein.

UNITED STATES PATENT OFFICE

Certificate of Correction

Patent No. 2,917,510 December 15, 1959

Albert Wettstein et al.

It is hereby certified that error appears in the printed specification of the above numbered patent requiring correction and that the said Letters Patent should read as corrected below.

Column 1, line 43, for "-11,28,21-" read — -11,18,21- —; line 64, for "-dioxo-19," read — -dioxo-9, —; column 2, line 35, for "precipitaed" read —precipitated—; line 65, for "-11$\beta$-18,21,trihydroxy-pregnene" read — -11$\beta$,18,21-trihydroxy-pregnene, —; same column 2, line 70, for "groups is" read —groups) is—; column 3, line 4, for "$^{4,9(11)}$-3,20-" read — $\Delta^{4,9(11)}$-3,20- —; line 24, strike out "and", first occurrence; column 4, line 5, for "18-20" read —18,20—; line 25, for "hydroxy," read — hydroxy- —; line 29, for "-3,18,20," read — -3,18,20- —.

Signed and sealed this 13th day of December 1960.

[SEAL]

Attest:
KARL H. AXLINE,
*Attesting Officer.*

ROBERT C. WATSON,
*Commissioner of Patents.*